(12) United States Patent
Takado et al.

(10) Patent No.: US 11,737,937 B2
(45) Date of Patent: Aug. 29, 2023

(54) STEERING MECHANISM AND WHEELCHAIR INCLUDING THE SAME

(71) Applicant: HONDA MOTOR CO., LTD., Tokyo (JP)

(72) Inventors: Junji Takado, Saitama (JP); Yasushi Yoneda, Kanagawa (JP)

(73) Assignee: Honda Motor Co., Ltd., Tokyo (JP)

( * ) Notice: Subject to any disclaimer, the term of this patent is extended or adjusted under 35 U.S.C. 154(b) by 122 days.

(21) Appl. No.: 17/018,515

(22) Filed: Sep. 11, 2020

(65) Prior Publication Data
US 2021/0085545 A1  Mar. 25, 2021

(30) Foreign Application Priority Data

Sep. 24, 2019 (JP) .................................. 2019-172534

(51) Int. Cl.
*A61G 5/10* (2006.01)
*A61G 5/02* (2006.01)
*B62K 21/08* (2006.01)

(52) U.S. Cl.
CPC .............. *A61G 5/1051* (2016.11); *A61G 5/02* (2013.01); *B62K 21/08* (2013.01)

(58) Field of Classification Search
CPC .......... A61G 5/1051; A61G 5/02; A61G 5/10; A61G 5/00; B62K 21/08; B62K 3/005
See application file for complete search history.

(56) References Cited

U.S. PATENT DOCUMENTS

| | | | |
|---|---|---|---|
| 8,313,117 B2 * | 11/2012 | Khare | B62H 7/00 280/270 |
| 2010/0263474 A1 * | 10/2010 | Tanaka | B62D 1/166 74/492 |
| 2011/0254245 A1 | 10/2011 | Taylor | |

FOREIGN PATENT DOCUMENTS

| | | | | |
|---|---|---|---|---|
| JP | 2012-000394 A | | 1/2012 | |
| JP | 2012019821 | * | 2/2012 | .............. A61G 5/02 |
| WO | 2020/003562 A1 | | 1/2020 | |

OTHER PUBLICATIONS

JP2012019821 description translation from Espacenet; downloaded on Jun. 17, 2022 (Year: 2022).*
English Machine translation of JP2012019821 from Espacenet.com (Year: 2012).*
Office Action dated Mar. 11, 2021 issued in the corresponding United Kingdom Patent Application No. GB 2014508.2.
Office Action dated Nov. 1, 2022 issued in the corresponding Japanese Patent Application No. 2019-172534 with the English translation thereof.

* cited by examiner

*Primary Examiner* — Minnah L Seoh
*Assistant Examiner* — Harold Eric Pahlck, III
(74) *Attorney, Agent, or Firm* — Carrier, Shende and Associates P.C.; Joseph P. Carrier; Jeffrey T. Gedeon (57) ABSTRACT

A wheelchair W includes: a column shaft (50) extending from the rear portion of a front fork (51) and turnably supported by a vehicle-body frame (2); a rocking bar (81*a*) that is rockably attached to the vehicle-body frame (2) and rocks according to a force applied by a rider; and a link mechanism (82) that joins the rocking bar (81*a*) and the column shaft (50) and turns the column shaft (50) according to rock of the rocking bar (81*a*).

8 Claims, 8 Drawing Sheets

STEERING MECHANISM AND WHEELCHAIR INCLUDING THE SAME

BACKGROUND OF THE INVENTION

Field of the Invention

The present invention relates to wheelchairs, particularly racing wheelchairs used for track races and marathons, and steering mechanisms used therefor.

Description of the Related Art

A conventional racing wheelchair used for track races and marathons includes: a cage on which a rider sits; a pair of rear wheels (driving wheels) mounted on the right and left of the cage; a vehicle-body frame extending from the front portion of the cage; a holding member turnably supported by the vehicle-body frame; and a front wheel (steering wheel) rotatably held by the holding member.

Some holding members used for such a wheelchair each include a front fork rotatably holding the front wheel, and a column shaft extending from the rear portion of the front fork and turnably supported by the vehicle-body frame. The rear portion of the column shaft is provided with a handle, and a rider operating the handle can set the steering angle of the front wheel.

A wheelchair of this type is known which includes a steering mechanism called a track lever, in addition to the holding member and the handle attached thereto, as a mechanism to set the steering angle of the front wheel (see Japanese Patent Laid-Open No. 2012-000394, for example).

The steering mechanism disclosed in Japanese Patent Laid-Open No. 2012-000394 includes a rocking bar that rocks laterally relative to a vehicle-body frame, a link mechanism that transmits rock of the rocking bar to a front fork of a holding member (and to a front wheel held by the front fork) to turn the front wheel, and a maintaining mechanism to maintain the turning angle (i.e., steering angle) of the front wheel.

With the steering mechanism mentioned above, a rider is allowed to apply a force by pressing a track lever provided on the rear end of the rocking bar by lightly tapping the track lever from the right or left to change the steering angle of the front wheel via the rocking bar and the link mechanism, and maintain the steering angle at a certain angle by means of the maintaining mechanism. In general, therefore, the steering mechanism is used at running along a corner having a prescribed curvature in track races.

According to the steering mechanism disclosed in Japanese Patent Laid-Open No. 2012-000394, the rocking bar is built within the vehicle-body frame. Part of the link mechanism (for specific example, a sub-handle for joining a damper and the front fork), however, is not housed in the vehicle-body frame and laterally protrudes from the vehicle-body frame.

The part of the steering mechanism not housed in the vehicle-body frame is liable to cause air resistance. In addition, such part might be conspicuous and spoil the beauty.

SUMMARY OF THE INVENTION

The present invention has been made in view of the above circumstances, and an object thereof is to provide a steering mechanism readily housed in a vehicle-body frame, and a wheelchair including the steering mechanism.

A steering mechanism according to the present invention is for a wheelchair that includes: a cage on which a rider sits; a vehicle-body frame extending from a front portion of the cage; a front fork being turnable relative to the vehicle-body frame; and a steering wheel rotatably held by the front fork, and the steering mechanism includes:

a column shaft extending from a rear portion of the front fork and turnably supported by the vehicle-body frame;

a rocking bar that is rockably attached to the vehicle-body frame and rocks according to a force applied by the rider; and a link mechanism that joins the rocking bar and the column shaft and turns the column shaft according to rock of the rocking bar.

According to the steering mechanism of the present invention, the link mechanism joins the rocking bar not to the front fork, as in the case of the conventional steering mechanism, but to the column shaft. This eliminates the need for some parts of the link mechanism (e.g., a sub-handle for joining a damper and the front fork).

With this, the steering mechanism can have a downsized link mechanism, so that the steering mechanism having the downsized link mechanism can also be downsized and thus readily housed in the vehicle-body frame. In addition, the number of the component parts can be reduced, leading to reduction in weight and cost.

The steering mechanism according to the present invention is preferably configured such that the link mechanism includes a rear-side arm connected to the rocking bar, a front-side arm connected to the column shaft, and a damper disposed between the rear-side arm and the front-side arm, the damper acts so as to transmit a force generated according to rock of the rocking bar to the column shaft and absorb a force generated according to turn of the column shaft, and the front-side arm is connected to a lateral side of the column shaft in plan view in a state where the steering wheel is not turned.

To attain adequate performance of the link mechanism (strictly, damper), it is preferable to maximize the damper in size. For this reason, the link mechanism is desirably joined to the lateral side or front side of the column shaft, rather than to the rear side of the column shaft (i.e., the side near the rocking bar) so as to increase the space to dispose the link mechanism.

If joined to the front side of the column shaft, however, the link mechanism may necessarily be complicated in structure in order that the link mechanism can act to turn the column shaft according to rock of the rocking bar.

The link mechanism is therefore joined to the lateral side of the column shaft, so that the space for disposing the link mechanism is reserved whereas the link mechanism is allowed to be relatively simple in structure. This facilitates further reduction in size and weight of the whole steering mechanism, allowing the steering mechanism to be readily housed in the vehicle-body frame.

The steering mechanism according to the present invention is preferably configured such that the link mechanism includes a rear-side arm connected to the rocking bar, a front-side arm connected to the column shaft, and a damper disposed between the rear-side arm and the front-side arm, the damper acts so as to transmit a force generated according to rock of the rocking bar to the column shaft and absorb a force generated according to turn of the column shaft, and a position at which the front-side arm is connected to the column shaft and a position at which the rear-side arm is connected to the rocking bar are on a line along a direction in which the damper acts, in side view in a state where the steering wheel is not turned.

With this configuration, the acting direction of the damper can be substantially in alignment with the moving directions of the front-side arm and rear-side arm during the action concerned. Thus, the force generated by the rock of the rocking bar can efficiently be transmitted via the damper, whereas turn of the column shaft can efficiently be absorbed by the damper.

As such, the performance required of the damper can be reduced; therefore, a small and light damper can be employed. This facilitates further reduction in size and weight of the whole steering mechanism, allowing the steering mechanism to be readily housed in the vehicle-body frame.

The steering mechanism according to the present invention is preferably configured such that the steering mechanism further includes a base member that is fixed to the vehicle-body frame and rockably holds the rocking bar, wherein the rocking bar is rockably attached to the vehicle-body frame via the base member, and a position at which the rocking bar is connected to the link mechanism is displaced from a position at which the rocking bar is connected to the base member.

The connecting positions of component parts are required to be large to some extent for attaining enough strength, and need a screw hole or the like for connection. Thus, such connecting positions may be bulky if collectively disposed. The connecting positions are hence displaced from one another, as described above, so as not to be excessively bulky. This prevents the steering mechanism from becoming bulky, avoiding difficulties in housing the steering mechanism in the vehicle-body frame.

The steering mechanism according to the present invention is, if connecting positions of component parts are to be displaced from each other, preferably configured such that the position at which the rocking bar is connected to the link mechanism is adjacent to the position at which the rocking bar is connected to the base member.

The connecting positions of component parts may be bulky if collectively disposed. Meanwhile, such connecting positions are required to have a certain level of strength; however, providing a plurality of high-strength portions may be disadvantageous in terms of cost.

The connecting positions are hence adjacently provided, as described above, which can prevent increase in portions requiring strength (and therefore, increase in cost) and prevent the component parts from becoming bulky owing to provision of the connecting positions. This prevents the steering mechanism from becoming bulky, avoiding difficulties in housing the steering mechanism in the vehicle-body frame. In addition, increase in cost can also be prevented.

The steering mechanism according to the present invention is, if connecting positions of component parts are to be displaced from each other, preferably configured such that the position at which the rocking bar is connected to the link mechanism is on a rear side of the position at which the rocking bar is connected to the base member.

If the position at which the rocking bar is connected to the link mechanism moves beyond the axis passing the position at which the rocking bar is connected to the base member (i.e., rocking axis of the rocking bar) and extending in the front-rear direction in response to rock of the rocking bar, the direction of the force transmitted from the rocking bar toward the column shaft would be inverted in course of such a movement. In this case, the link mechanism should be complicated in structure.

The position at which the rocking bar is connected to the link mechanism is hence on the rear side of the position at which the rocking bar is connected to the base member, as described above, so that the position at which the rocking bar is connected to the link mechanism is less likely to move across the axis. This eliminates the need to complicate the link mechanism in structure. This prevents the steering mechanism from becoming bulky, avoiding difficulties in housing the steering mechanism in the vehicle-body frame.

The steering mechanism according to the present invention is preferably configured such that the column shaft has a tubular portion and a solid portion continuous with a rear portion of the tubular portion, a rear-side end of the front fork is inserted into the tubular portion, and the link mechanism is connected to the solid portion.

With the column shaft and the front fork having a nested structure, the holding member composed thereof can be reduced in weight. Meanwhile, if the column shaft simply has the tubular portion only, the strength of the position at which the column shaft is connected to the link mechanism may be insufficient. With the solid portion provided to the column shaft, the strength of the position at which the column shaft is connected to the link mechanism can be sufficient because of the thickness of the solid portion.

A wheelchair according to the present invention includes: a cage on which a rider sits; a hollow vehicle-body frame extending from the front portion of the cage; a front fork being turnable relative to the vehicle-body frame; and a steering wheel rotatably held by the front fork, and the wheelchair includes any one of the steering mechanisms described above.

A steering mechanism according to the present invention is for a wheelchair that includes: a cage on which a rider sits; a vehicle-body frame extending from a front portion of the cage; a holding member turnably supported by the vehicle-body frame; and a steering wheel rotatably held by the holding member, and the steering mechanism includes:

a base member fixed to the vehicle-body frame;

a rocking bar that is rockably attached to the vehicle-body frame via the base member and rocks according to a force applied by the rider; and a link mechanism that joins the rocking bar and the holding member and turns the holding member according to rock of the rocking bar, wherein a position at which the rocking bar is connected to the link mechanism is displaced in a front-rear direction from a position at which the rocking bar is connected to the base member.

The connecting positions of component parts are required to be large to some extent for attaining enough strength, and need a screw hole or the like for connection. Thus, such connecting positions may be bulky if collectively disposed. The connecting positions are hence displaced from one another, as described above, so as not to be excessively bulky. This prevents the steering mechanism from becoming bulky, avoiding difficulties in housing the steering mechanism in the vehicle-body frame.

The steering mechanism according to the present invention is preferably configured such that the position at which the rocking bar is connected to the link mechanism is adjacent to the position at which the rocking bar is connected to the base member.

The connecting positions of component parts may be bulky if collectively disposed. Meanwhile, such connecting positions are required to have a certain level of strength; however, providing a plurality of high-strength portions may be disadvantageous in terms of cost.

The connecting positions are hence adjacently provided, as described above, which can prevent increase in portions requiring strength (and therefore, increase in cost) and prevent the component parts from becoming bulky owing to provision of the connecting positions. This prevents the steering mechanism from becoming bulky, avoiding difficulties in housing the steering mechanism in the vehicle-body frame. In addition, increase in cost can also be prevented.

The steering mechanism according to the present invention is preferably configured such that the position at which the rocking bar is connected to the link mechanism is on a rear side of the position at which the rocking bar is connected to the base member.

If the position at which the rocking bar is connected to the link mechanism moves beyond the axis passing the position at which the rocking bar is connected to the base member (i.e., rocking axis of the rocking bar) and extending in the front-rear direction in response to rock of the rocking bar, the direction of the force transmitted from the rocking bar toward the column shaft would be inverted in course of such a movement. In this case, the link mechanism should be complicated in structure.

The position at which the rocking bar is connected to the link mechanism is hence on the rear side of the position at which the rocking bar is connected to the base member, as described above, so that the position at which the rocking bar is connected to the link mechanism is less likely to move across the axis. This eliminates the need to complicate the link mechanism in structure. This prevents the steering mechanism from becoming bulky, avoiding difficulties in housing the steering mechanism in the vehicle-body frame.

DETAILED DESCRIPTION OF THE PREFERRED EMBODIMENTS

The configuration of a wheelchair W according to an embodiment will be described below with reference to the drawings.

The wheelchair W according to the embodiment is a racing wheelchair used for track races and marathons. The steering mechanism of the present invention, however, is not limited to such a configuration and may be applied to general wheelchairs other than those used for track races and marathons.

A general configuration of the wheelchair W will be first described with reference to FIGS. 1 to 3.

Figure 1:
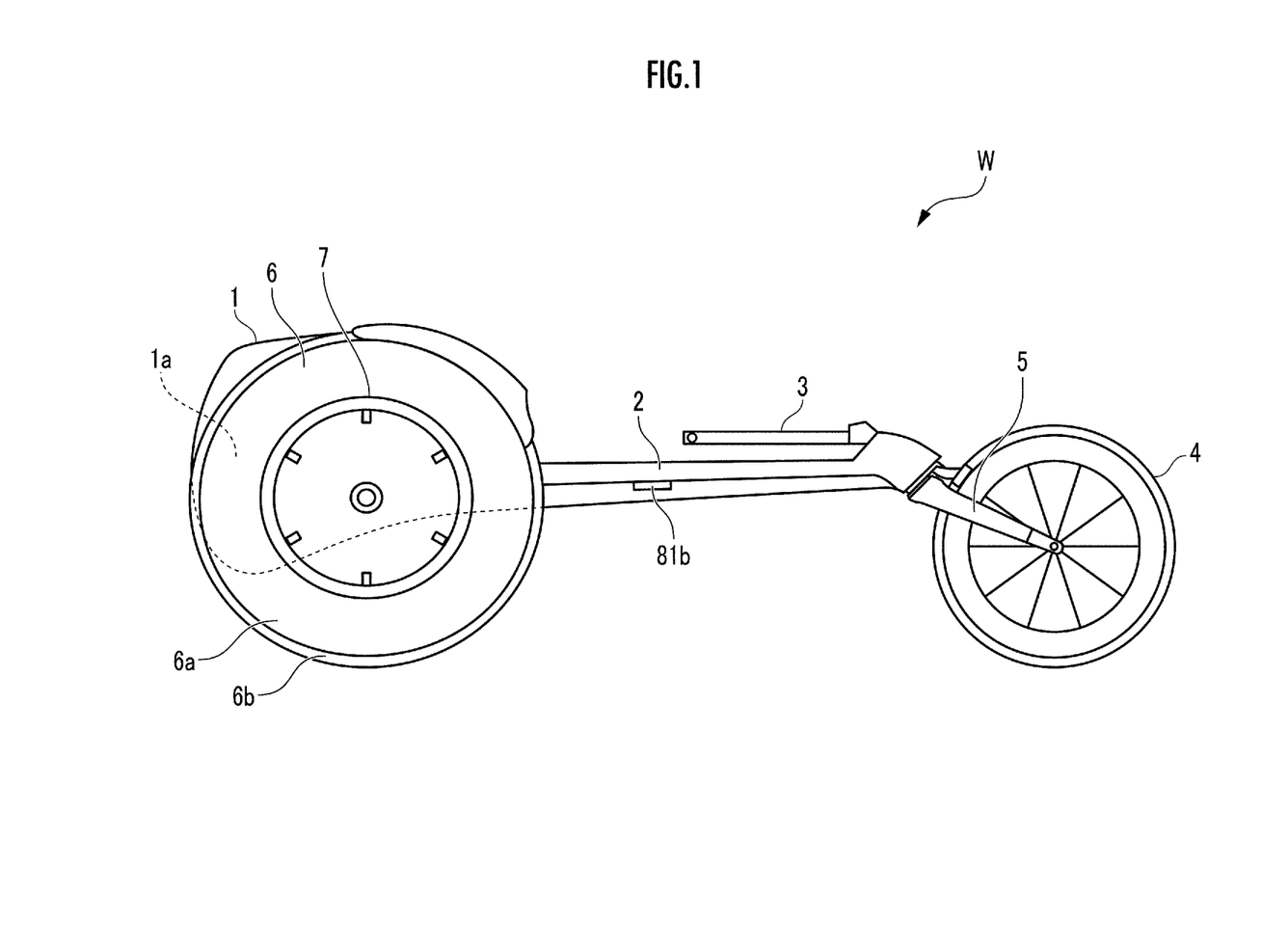
FIG. 1 is a side view of a wheelchair according to an embodiment.
Figure 2:
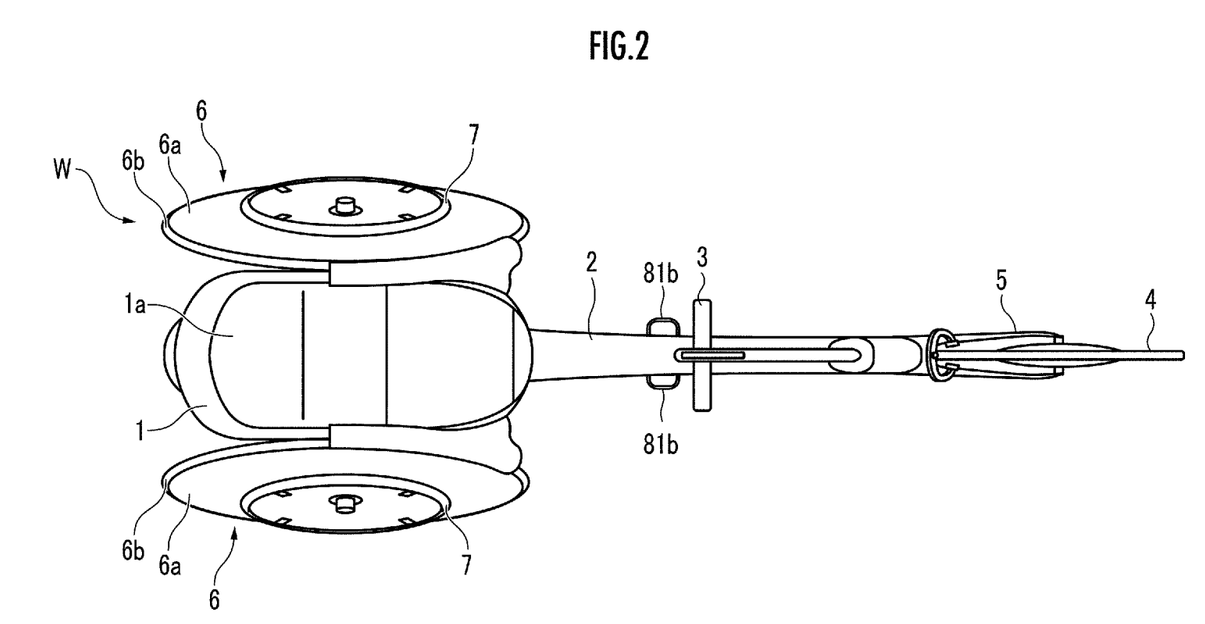
FIG. 2 is a plan view of the wheelchair illustrated in FIG. 1.

As illustrated in FIGS. 1 and 2, the wheelchair W includes: a cage 1; a vehicle-body frame 2 extending from the front portion of the cage 1; a steering handle 3 being turnable relative to the vehicle-body frame 2; a front wheel 4 (steering wheel) disposed at the front end of the vehicle-body frame 2; a holding member 5 attached at the front end of the vehicle-body frame 2, joined to the handle 3, and rotatably holding the front wheel 4; a pair of rear wheels 6 (driving wheels) mounted on the right and left of the cage 1; and hand rims 7 attached on the rear wheels 6 on the opposite side from the cage 1.

As illustrated in FIG. 2, the cage 1 has a top opening, the inside of which is provided with a sitting seat 1a for receiving a racer (rider) sitting thereon.

The handle 3 is joined to the rear-side end of a column shaft 50 (see FIG. 3), described later, of the holding member 5 pivotably supported at the front end of the vehicle-body frame 2.

The rear wheels 6 are each composed of a wheel 6a and a tire 6b fitted to the wheel 6a. The rear wheels 6 are mounted to the cage 1 so as to be tilted such that the upper portion is closer to the center side, i.e., the side of the cage 1.

The hand rim 7 is fixed to the rear wheel 6 such that they are integrally rotatable. A racer sitting on the sitting seat 1a transmits a driving force to the rear wheels 6 via the hand rims 7.

Figure 3:
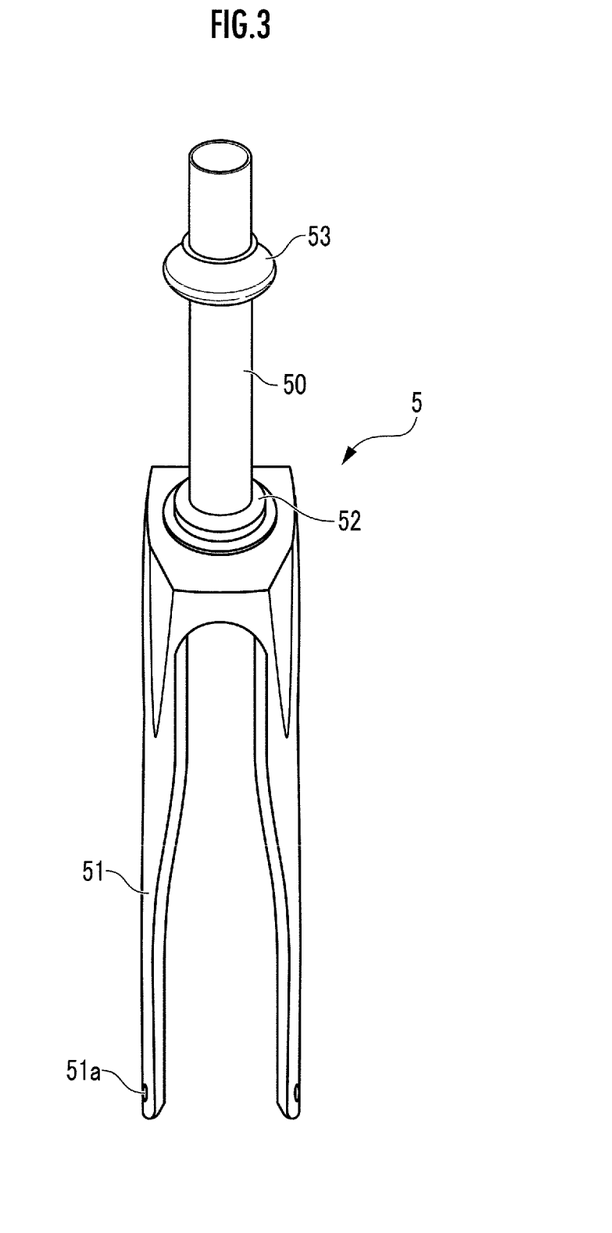
FIG. 3 is a perspective view of a front fork and a column shaft of the wheelchair illustrated in FIG. 1 as viewed from the front side.

As illustrated in FIG. 3, the holding member 5 includes the column shaft 50 supported by the front end of the vehicle-body frame 2 and a front fork 51 having a bifurcated shape extending to the front from the column shaft 50.

The front fork 51 has front ends each provided with a bearing hole 51a for supporting the axle of the front wheel 4. The column shaft 50 has, at its end on the side of the front fork 51 (front side), an annular first bearing 52 fitted thereon and an annular second bearing 53 fitted thereon slightly near the handle 3 relative to the central portion.

The column shaft 50 is turnably supported by a front-end frame member 22, described later, of the vehicle-body frame 2 via the first bearing 52 and the second bearing 53 (see FIG. 4). The opposite end of the column shaft 50 from the front fork 51 is joined to the handle 3 (see FIGS. 1 and 2).

Turning the handle 3 of the wheelchair W having the above-described holding member 5 correspondingly causes the holding member 5 joined to the handle 3 to turn together with the front wheel 4 held by the holding member 5.

As such, it is allowed to turn and drive the wheelchair W in a desired direction while setting the direction of the front wheel 4 (steering angle of the front wheel 4) via the holding member 5 through operations of the handle 3.

Meanwhile, the wheelchair W according to the embodiment includes not only the handle 3 but also a steering mechanism 8 as a mechanism to set the steering angle of the front wheel 4.

Figure 4:
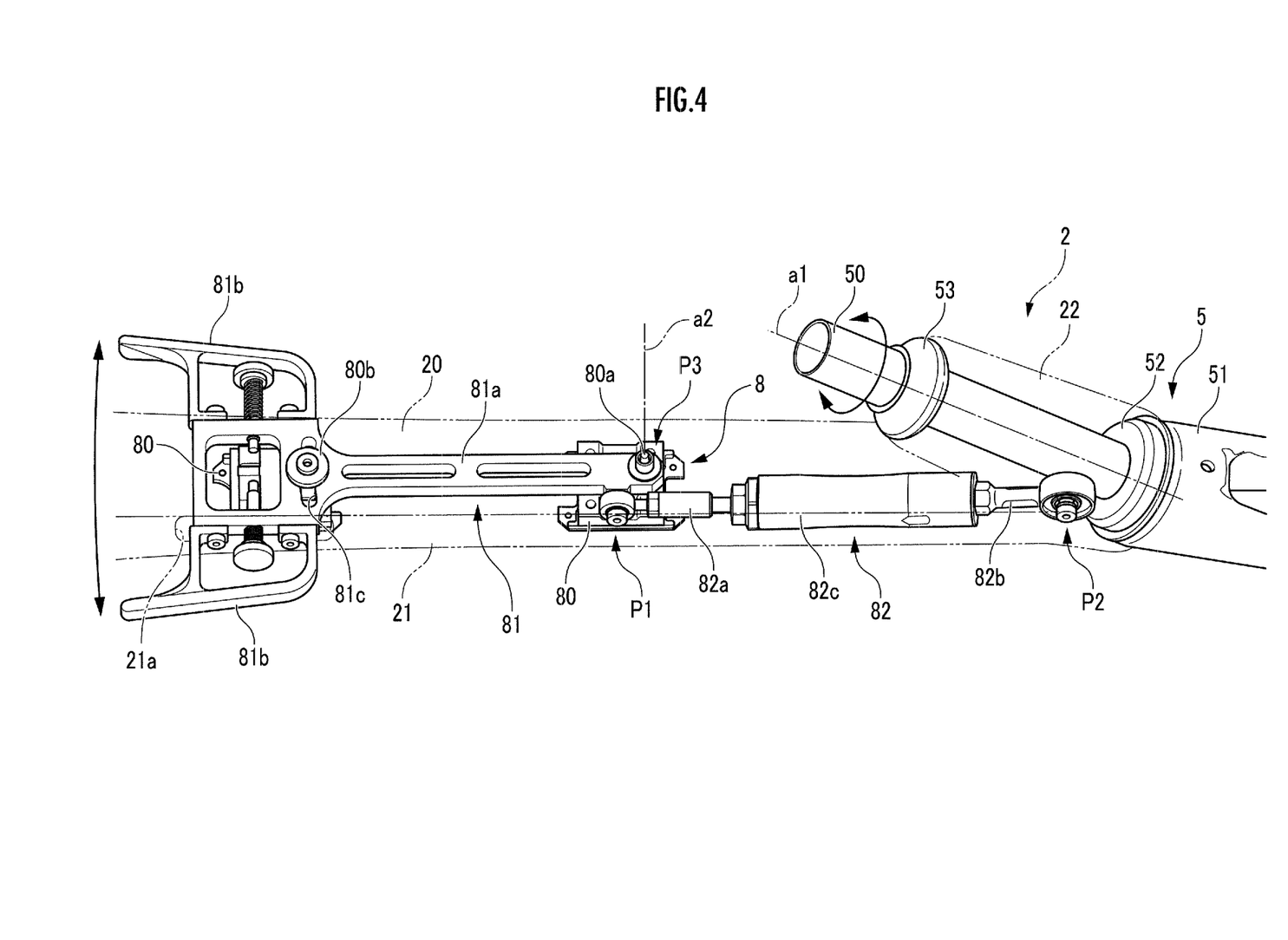
FIG. 4 is perspective view of a steering mechanism of the wheelchair illustrated in FIG. 1 as viewed from the top lateral side.
Figure 5:
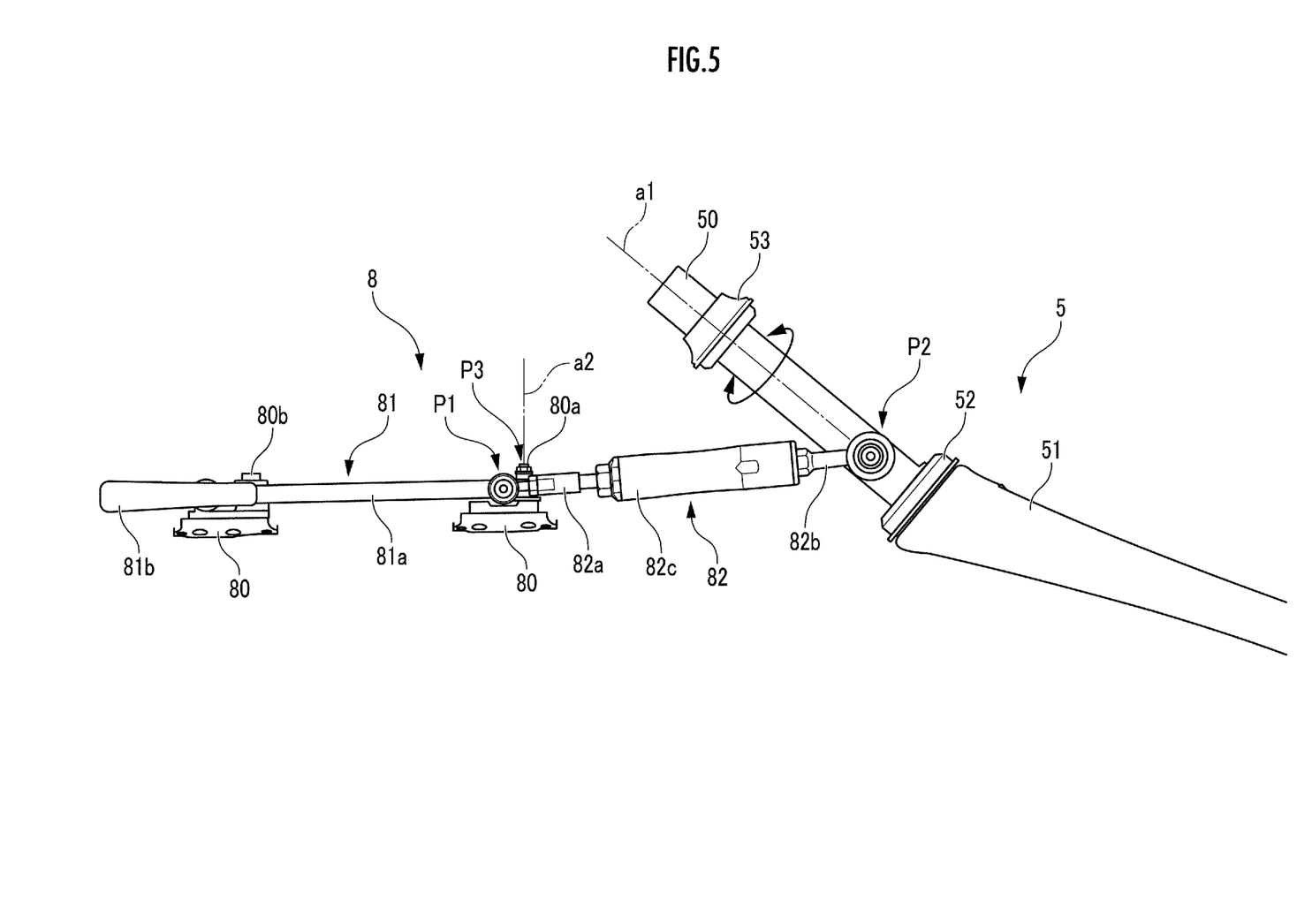
FIG. 5 is a side view of the steering mechanism illustrated in FIG. 4.
Figure 6:
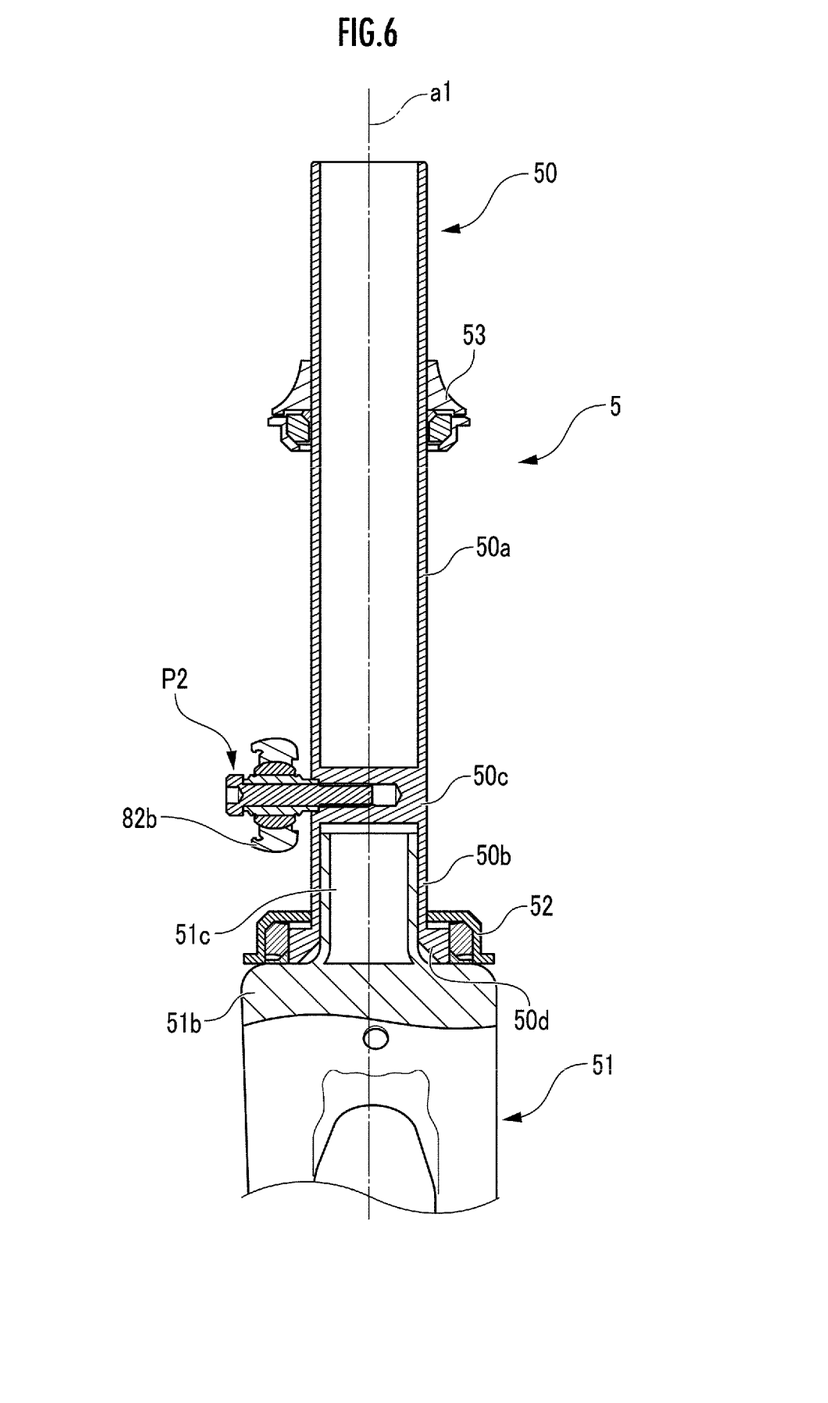
FIG. 6 is a sectional view of a connecting portion of the front fork and the column shaft of the steering mechanism illustrated in FIG. 4 as viewed from the front side.

With reference to FIGS. 4 to 6, structures of the steering mechanism 8 of the wheelchair W and the vehicle-body frame 2 housing the steering mechanism 8 will be described in detail below.

As illustrated in FIG. 4, the vehicle-body frame 2 has an upper-side frame member 20 extending to the front from the cage 1 (see FIGS. 1 and 2), a lower-side frame member 21 disposed under the upper-side frame member 20, and the front-end frame member 22 provided at the front end of the upper-side frame member 20.

The upper-side frame member 20 and the lower-side frame member 21 are connected to form a tubular member. The tubular member has an internal space housing substantially the whole of the steering mechanism 8.

Both side surfaces of the lower-side frame member 21 are provided with a pair of right and left first insertion holes 21a. Positions of the pair of right and left first insertion holes 21a correspond to those of a pair of right and left track levers 81b provided to a rocking bar 81a, described later. Each of the first insertion holes 21a is sized to allow insertion and removal of the track lever 81b during rock of the rocking bar 81a.

The front-end frame member 22 has a cup-like shape opening downward. The rear end (bottom of the cup) of the front-end frame member 22 has a second insertion hole (not shown). The front-end frame member 22 is disposed on the upper side of the front fork 51 of the holding member 5 and the column shaft 50 is inserted therethrough.

In the state where the front-end frame member 22 is attached to the holding member 5, the internal space of the front-end frame member 22 houses the front end of the steering mechanism 8 and the central portion and front end of the column shaft 50 of the holding member 5, with the rear end of the column shaft 50 protruding through the second insertion hole.

The previously mentioned first bearing 52 is fitted in an opening on the front-end side of the front-end frame member 22, whereas the second bearing 53 is fitted in the second insertion hole provided on the bottom on the rear-end side.

With the above configuration, the column shaft 50 with the first bearing 52 and second bearing 53 externally fitted thereon is supported turnably relative to the vehicle-body frame 2 about a turning axis a1 passing the center of the opening and the center of the second insertion hole. Hence, the holding member 5 including the column shaft 50, and the handle 3 attached to the rear end of the column shaft 50 are also turnably supported relative to the vehicle-body frame 2.

The steering mechanism 8 includes base members 80 for fixing the steering mechanism 8 to the vehicle-body frame 2, an application part 81 to which a rider applies a force to change the steering angle, and a link mechanism 82 that transmits the force applied to the application part 81 to change the steering angle of the front wheel 4. The steering mechanism 8 includes these components and the holding member 5.

The base members 80 are composed of two members disposed away from each other in the front-rear direction, and both of which are fixed to the internal surface of the lower-side frame member 21 by means of screws or the like.

To the base member 80 on the front side (a base member according to the present invention) is rockably attached the front end of the rocking bar 81a, described later, by means of a first pin 80a. To the base member 80 on the rear side is attached the rear end of the rocking bar 81a by means of a second pin 80b so as to be slidable in the circumferential direction (lateral direction) about the central axis of the first pin 80a (rocking axis a2).

The application part 81 includes the rocking bar 81a extending in the front-rear direction and the pair of right and left track levers 81b fixed on the right and left surfaces on the rear end of the rocking bar 81a. The rear end of the rocking bar 81a is provided with a slide hole 81c.

A rider presses or taps the track levers 81b to rock the rocking bar 81a, applying the steering mechanism 8 with a force to set the steering angle of the front wheel 4. The force is transmitted to the column shaft 50 via the link mechanism 82 joined to the front end of the rocking bar 81a.

The rocking bar 81a is rockable by means of the first pin 80a about the rocking axis a2 identical to the axis of the first pin 80a.

In the state where a force to set the steering angle of the front wheel 4 is not applied from the rider and the rocking bar 81a is not rocked (the state illustrated in FIG. 4), the pair of track levers 81b slightly protrude through the pair of right and left first insertion holes 21a provided on both of the lateral surfaces of the vehicle-body frame 2.

In the state where a force to set the steering angle of the front wheel 4 is applied from the rider and the rocking bar 81a is rocked, one of the pair of track levers 81b protrudes from a corresponding one of the pair of right and left first insertion holes 21a on both of the lateral surfaces of the vehicle-body frame 2, whereas the other track lever 81b is substantially housed in the vehicle-body frame 2.

The slide hole 81c is a laterally long hole slightly curved about the rocking axis a2, vertically penetrating the rear end of the rocking bar 81a. The radial width of the slide hole 81c is slightly greater than the diameter of the shaft portion of the second pin 80b. The rocking bar 81a is thus slidable within the range defined by the slide hole 81c.

A circumferential edge of the slide hole 81c is pressed by the head portion of the second pin 80b inserted through the slide hole 81c. The circumferential edge of the slide hole 81c is hence in the state of being sandwiched between the head portion and the base member 80 to which the second pin 80b is fixed. Accordingly, the rocking position of the rocking bar 81a is maintained by the pressing force applied to the rocking bar 81a from the second pin 80b and the base member 80.

That is, the steering angle of the front wheel 4 can be fixed at a certain angle upon being set through the rocking bar 81a. For specific example, the steering angle can be fixed at an angle corresponding to the degree of curve of a track corner when the wheelchair W is used for a track race.

The rocking direction of the rocking bar of the present invention is not limited to the lateral direction, and may be suitably designed according to the configuration of the wheelchair. For example, the rocking direction may be the vertical direction or the front-rear direction.

In the present invention, the mechanism to apply the rocking bar with a force to set the steering angle of the steering wheel is not limited to such a mechanism as the track levers 81b described above. In the case of a rocking bar configured to laterally rock, for example, a link mechanism that drives according to a protrusion being slid may be provided near the rear end of the rocking bar so that such a force can be applied to the rocking bar via the link mechanism.

The link mechanism 82 includes a rear-side arm 82a connected to the rocking bar 81a, a front-side arm 82b connected to the column shaft 50, and a damper 82c disposed between the rear-side arm 82a and the front-side arm 82b.

The rear-side arm 82a extends rearward from the rear end of the damper 82c, and is fixed to the side surface of the front end of the rocking bar 81a via a ball joint. The front-side arm 82b extends frontward from the front end of the damper 82c, and is fixed to the circumferential surface of the column shaft 50 via a ball joint The ball joint for the front-side arm 82b is greater in size than the ball joint for the rear-side arm 82a. This is for the reason that a load on a position at which the front-side arm 82b is connected to the column shaft 50 (hereinafter referred to as "second connecting position P2") due to the rock of the rocking bar 81a and the like is greater than a load on a position at which the rear-side arm 82a is connected to the rocking bar 81a (hereinafter referred to as "first connecting position P1") due to the vibration from the front wheel 4, turn of the column shaft 50, and the like.

The damper 82c acts so as to transmit a force generated according to rock of the rocking bar 81a to the column shaft 50 and absorb a force generated according to turn of the column shaft 50.

More specifically, the damper 82c neither expand nor contract in response to rock of the rocking bar 81a. Thus, the rear-side arm 82a, the front-side arm 82b, and the damper 82c act like a single bar, so that the column shaft 50 turns according to rock of the rocking bar 81a.

In contrast, when the column shaft 50 turns according to turn of the handle 3, the damper 82c expands or contracts according to the turn of the column shaft 50. This allows changes in relative positions of the rear-side arm 82a and the front-side arm 82b, and thus the rocking bar 81a does not rock in response to turn of the column shaft 50.

Since the steering mechanism 8 is provided with the damper 82c described above, the column shaft 50 and the handle 3 turn together when the steering angle is changed by rocking the rocking bar 81a to turn the column shaft 50. In contrast, the column shaft 50 turns whereas the rocking bar 81a does not turn when the steering angle is changed by turning the handle 3 to turn the column shaft 50.

The steering mechanism 8 has the rocking bar 81a joined not to the front fork 51, as in the case of the conventional steering mechanism, but to the column shaft 50 via the link mechanism 82 configured as above. Thus, the link mechanism 82 does not necessitate a sub-handle or the like for joining the front-side arm 82b and front fork 51 according to the steering mechanism 8.

With this, the steering mechanism 8 can have a downsized link mechanism 82, so that the steering mechanism 8 having the downsized link mechanism 82 can also be downsized and thus readily housed in the vehicle-body frame 2. In addition, the number of the component parts can be reduced, leading to reduction in weight and cost.

The damper of the link mechanism of the present invention may be any damper that acts so as to transmit a force generated according to rock of the rocking bar to the column shaft and absorb a force generated according to turn of the column shaft. Accordingly, for example, the damper may expand or contract to some extent in response to rock of the rocking bar, provided that the column shaft is prevented from turning due to weights or the like of the steering wheel and the holding member during rock of the rocking bar.

To attain adequate performance of the link mechanism 82 (strictly, damper 82c), it is preferable to maximize the damper 82c in size. For this reason, the link mechanism 82 is desirably joined to the lateral side or front side of the column shaft 50, rather than to the rear side of the column shaft 50 (i.e., the side near the rocking bar 81a) so as to increase the space to dispose the link mechanism 82.

If joined to the front side of the column shaft 50, however, the link mechanism 82 may necessarily be complicated in structure in order that the link mechanism 82 can act to turn the column shaft 50 according to rock of the rocking bar 81a.

For specific example, such a complicated structure might be necessary that the front-side arm 82b is caused to move greatly around the column shaft 50 according to turn of the column shaft 50.

Thus, the steering mechanism 8 is configured such that the front-side arm 82b is connected to the lateral side of the column shaft 50 in plan view in the state where the front wheel 4 (i.e., column shaft 50) is not turned (i.e., the state of traveling straight forward in response to drive of the rear wheels 6). That is, it is configured such that the second connecting position P2 is on the lateral side of the column shaft 50.

With this, the steering mechanism 8 reserves the space for disposing the link mechanism 82 and allows a link mechanism to be relatively simple in structure. This facilitates further reduction in size and weight of the whole steering mechanism 8, allowing the steering mechanism 8 to be readily housed in the vehicle-body frame 2.

Note that the steering mechanism of the present invention is not limited to the configuration described above; and the link mechanism may be connected to the front side or rear side of the column shaft according to the shape or the like of other component parts of the steering mechanism and the wheelchair.

As illustrated in FIG. 5, the link mechanism 82 is configured such that the position at which the front-side arm 82b is connected to the column shaft 50 (second connecting position P2) and the position at which the rear-side arm 82a is connected to the rocking bar 81a (first connecting position P1) are on the line along the expansion/contraction direction (the longitudinal direction, i.e., the acting direction) of the damper 82c, in side view in the state where the front wheel 4 is not turned (that is, the state where the column shaft 50 is not turned).

With this configuration, the expansion/contraction direction of the damper 82c is substantially in alignment with the moving directions of the front-side arm 82b and rear-side arm 82a during the expansion/contraction concerned. Thus, the force generated by the rock of the rocking bar 81a can efficiently be transmitted via the damper 82c, whereas turn of the column shaft 50 can efficiently be absorbed by the damper 82c.

As such, the performance required of the damper 82c can be reduced; therefore, a small and light damper 82c can be employed. This facilitates further reduction in size and weight of the steering mechanism 8, allowing the steering mechanism 8 to be readily housed in the vehicle-body frame 2.

According to the embodiment, the expansion/contraction direction of the damper 82c (the direction of the straight line passing the first connecting position P1 and the second connecting position P2) is slightly oblique with respect to the extending direction of the rocking bar 81a in side view. Instead, if the expansion/contraction direction is aligned with the extending direction of the rocking bar 81a, the force can further efficiently be transmitted to the damper 82c, and the performance required of the damper 82c can further be reduced.

The connecting positions of component parts are required to be large to some extent for attaining enough strength, and need a screw hole or the like for connection. Thus, such connecting positions may be bulky if collectively disposed. Meanwhile, such connecting positions are required to have a certain level of strength; however, providing a plurality of high-strength portions may be disadvantageous in terms of cost.

For this reason, the steering mechanism 8 is configured such that the position at which the rear-side arm 82a is connected to the rocking bar 81a (first connecting position P1) is adjacent to and displaced to the rear from the position at which the rocking bar 81a is connected to the base member 80 (hereinafter referred to as "third connecting position P3"), as illustrated in FIG. 4.

Because of the connecting positions displaced from one another as described above, the steering mechanism 8 has the connecting positions not excessively bulky. This prevents the steering mechanism 8 from becoming bulky, avoiding difficulties in housing the steering mechanism 8 in the vehicle-body frame 2. Because of the connecting positions adjacent to one another as described above, the steering mechanism 8 suppresses increase in portions requiring strength (and therefore, increase in cost).

For the sole purpose of reduction in size and cost, the first connecting position P1 may be displaced to the front relative to the third connecting position P3.

If displaced to the front (e.g., if the first connecting position P1 is provided at the tip of the rocking bar 81a), however, the first connecting position P1 may move beyond the axis that passes the third connecting position P3 (i.e., rocking axis a2) and extends in the front-rear direction in response to rock of the rocking bar 81a.

If such a movement is generated, the direction of the force transmitted from the rocking bar 81a toward the column shaft 50 would be inverted in course of the movement. For coping with the inversion, the link mechanism 82 should be complicated in structure.

For this reason, the steering mechanism 8 has the first connecting position P1 on the rear side of the third connecting position P3. This prevents the first connecting position P1 from moving beyond the axis. As a result, the link mechanism 82 is not complicated in structure.

Note that the steering mechanism of the present invention is not limited to such a structure; and connecting positions of component parts may be appropriately set according to the shape or the like of other component parts of the steering mechanism and the wheelchair. For example, a plurality of the connecting positions may be collectively disposed.

Meanwhile, employing a hollow member for the column shaft 50 of the holding member 5, which constitutes part of the steering mechanism 8, may be considered for further reduction in weight.

The column shaft 50, however, receives vibration from the front wheel 4 via the front fork 51 and also receives the force generated according to rock of the rocking bar 81a via the link mechanism 82, and thus is required to have a certain level of strength. Hence, if wholly made up of a hollow member, the column shaft 50 may fail to attain the strength required.

For this reason, the steering mechanism 8 has the column shaft 50 including a first tubular portion 50a connected to the handle 3, a second tubular portion 50b connected to the front fork 51, and a columnar solid portion 50c between and continuous with the first tubular portion 50a and the second tubular portion 50b, as illustrated in FIG. 6.

The steering mechanism 8 has the front fork 51 including a fork-shaped main portion 51b branching into two parts for holding the front wheel 4 (see FIG. 3) and a tubular columnar portion 51c extending and protruding from the rear side of the main portion 51b.

The columnar portion 51c of the front fork 51 is inserted from below into the second tubular portion 50b of the column shaft 50. At this time, an annular portion 50d being the front-side end of the second tubular portion 50b abuts on the circumferential portion of the columnar portion 51c of the main portion 51b of the front fork 51.

The steering mechanism 8 has the column shaft 50 and the front fork 51 having a nested structure as described above, so as to be improved in assemblability and reduced in weight. In addition, the column shaft 50 and the front fork 51 abutting on each other provide enough strength to resist, for example, vibration from the front wheel 4 via the front fork 51.

The link mechanism 82 has the front-side arm 82b connected to the solid portion 50c of the column shaft 50 from the circumferential surface side. With this, the strength of the position at which the column shaft 50 is connected to the link mechanism 82 can be sufficient because of the thickness of the solid portion 50c.

Note that the steering mechanism of the present invention is not limited to such a structure; and the structure of the holding member may be appropriately changed according to the shape or the like of other component parts of the steering mechanism and the wheelchair. For example, the column shaft may be wholly solid or hollow according to the strength required. Alternatively, only the portion to receive the front fork inserted thereto may be hollow. Alternatively, the front fork and the column shaft may be integral. Alternatively, the front fork may be provided with a hole to receive the column shaft inserted thereto.

The embodiment as illustrated in the drawings has been described above; however, the present invention is not limited to such configurations.

Figure 7:
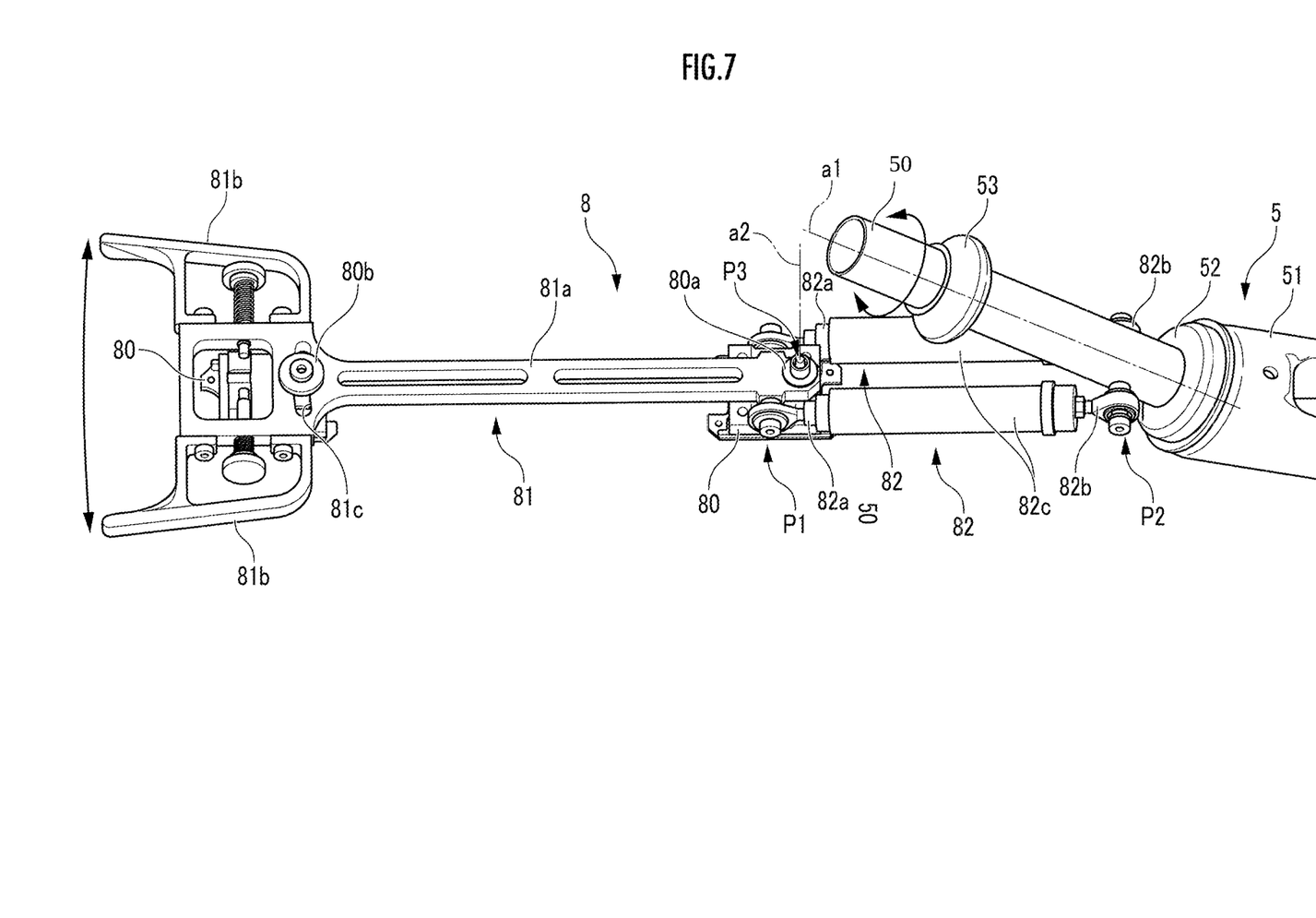
FIG. 7 is a perspective view of a steering mechanism according to a first modification as viewed from the top lateral side.

For example, a single link mechanism 82 is provided according to the embodiment. The steering mechanism of the present invention, however, is not limited to such a configuration and two or more link mechanisms may be provided. For specific example, a pair of right and left link mechanisms 82 may be provided to sandwich the rocking bar 81a and the column shaft 50 as in a first modification illustrated in FIG. 7.

According to the embodiment described above, the link mechanism 82 includes the rear-side arm 82a connected to the rocking bar 81a, the front-side arm 82b connected to the column shaft 50, and the damper 82c disposed between the rear-side arm 82a and the front-side arm 82b.

The link mechanism of the steering mechanism of the present invention, however, is not limited to such a structure; and may be any link mechanism that joins the rocking bar to the column shaft and turns the column shaft according to rock of the rocking bar. Thus, the structure of the link mechanism may be appropriately changed according to the shape or the like of other component parts of the steering mechanism and the wheelchair.

According to the embodiment described above, the first connecting position P1 being the position at which the rear-side arm 82a is connected to the rocking bar 81a and the second connecting position P2 being the position at which the front-side arm 82b is connected to the column shaft 50 are on the same side relative to the axis that passes the rocking axis a2, about which the rocking bar 81a rocks, and extends in the front-rear direction.

Figure 8:
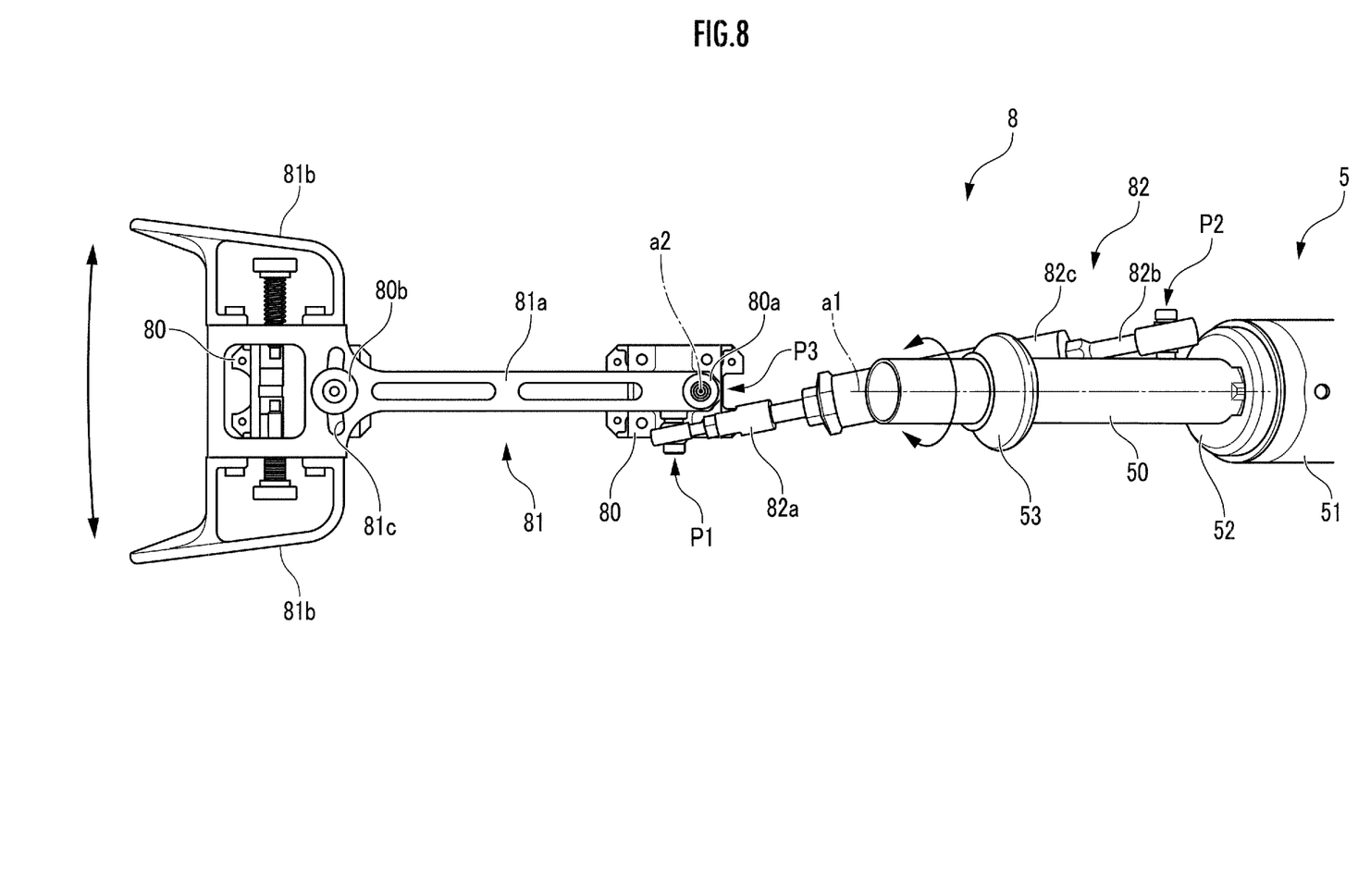
FIG. 8 is a plan view of a steering mechanism according to a second modification.

The steering mechanism of the present invention is not limited to such configurations. For example, the first connecting position P1 and the second connecting position P2 may be provided on the opposite sides relative to the axis that passes the rocking axis a2, about which the rocking bar 81*a* rocks, and extends in the front-rear direction, as in a second modification illustrated in FIG. 8.

According to the embodiment described above, the link mechanism 82 joins the rocking bar 81*a* and the column shaft 50. The steering mechanism of the present invention, however, is not limited to such a configuration; and the link mechanism may be connected not to the column shaft but to the front fork in the case where the position at which the rocking bar is connected to the link mechanism is to be displaced from the position at which the rocking bar is connected to the base member.

What is claimed is:

1. A steering mechanism for a wheelchair that includes: a cage on which a rider sits; a vehicle-body frame extending from a front portion of the cage; a column shaft turnably supported relative to the vehicle-body frame; a front fork extending forward from the column shaft; and a steering wheel rotatably held by the front fork,
    the steering mechanism comprising:
    a rocking bar that is rockably attached to the vehicle-body frame and rocks according to a force applied by the rider; and
    a linear link mechanism that turns the column shaft according to rock of the rocking bar,
    wherein the rocking bar and the link mechanism are housed in the vehicle-body frame,
    the column shaft has a tubular portion and a solid portion continuous with a rear portion of the tubular portion,
    the front fork includes a bifurcated fork-shaped main portion which holds the steering wheel and a columnar portion extending and protruding from a rear side of the main portion and inserted into the column shaft, the columnar portion is inserted into the tubular portion, and
    the link mechanism is connected to the solid portion.

2. The steering mechanism according to claim 1, wherein the link mechanism includes a linear rear-side arm connected to the rocking bar, a linear front-side arm connected to the column shaft, and a damper disposed between the rear-side arm and the front-side arm,
    the damper acts so as to transmit a force generated according to rock of the rocking bar to the column shaft, and absorb a force generated according to turn of the column shaft, and
    the front-side arm is connected to a lateral side of the column shaft in plan view in a state where the steering wheel is not turned.

3. The steering mechanism according to claim 1, wherein the link mechanism includes a linear rear-side arm connected to the rocking bar, a linear front-side arm connected to the column shaft, and a damper disposed between the rear-side arm and the front-side arm,
    the damper acts so as to transmit a force generated according to rock of the rocking bar to the column shaft, and absorb a force generated according to turn of the column shaft, and
    a position at which the front-side arm is connected to the column shaft and a position at which the rear-side arm is connected to the rocking bar are on a line along a direction in which the damper acts, in side view in a state where the steering wheel is not turned.

4. The steering mechanism according to claim 1, further comprising:
    a base member that is fixed to the vehicle-body frame and rockably holds the rocking bar, wherein
    the rocking bar is rockably attached to the vehicle-body frame via the base member, and
    a position at which the rocking bar is connected to the link mechanism is displaced from a position at which the rocking bar is connected to the base member.

5. A wheelchair including a cage on which a rider sits; a vehicle-body frame extending from a front portion of the cage; a front fork being turnable relative to the vehicle-body frame; and a steering wheel rotatably held by the front fork,
    the wheelchair comprising the steering mechanism according to claim 1.

6. The steering mechanism according to claim 1, wherein the column shaft is smaller in a diameter than the front fork,
    a forward-side end portion of the link mechanism is connected to the column shaft, and
    a rear-side end portion of the link mechanism is connected to the rocking bar.

7. A steering mechanism for a wheelchair that includes: a cage on which a rider sits; a vehicle-body frame extending from a front portion of the cage; a column shaft turnably supported relative to the vehicle-body frame; a front fork extending forward from the column shaft; and a steering wheel rotatably held by the front fork,
    the steering mechanism comprising:
    a rocking bar that is rockably attached to the vehicle-body frame and rocks according to a force applied by the rider;
    a linear link mechanism that turns the column shaft according to rock of the rocking bar; and
    a base member that is fixed to the vehicle-body frame and rockably holds the rocking bar,
    wherein the rocking bar and the link mechanism are housed in the vehicle-body frame,
    the rocking bar is rockably attached to the vehicle-body frame via the base member,
    a position at which the rocking bar is connected to the link mechanism is displaced from a position at which the rocking bar is connected to the base member, and
    the position at which the rocking bar is connected to the link mechanism is adjacent to the position at which the rocking bar is connected to the base member.

8. A steering mechanism for a wheelchair that includes: a cage on which a rider sits; a vehicle-body frame extending from a front portion of the cage; a column shaft turnably supported relative to the vehicle-body frame; a front fork extending forward from the column shaft; and a steering wheel rotatably held by the front fork,
    the steering mechanism comprising:
    a rocking bar that is rockably attached to the vehicle-body frame and rocks according to a force applied by the rider;
    a linear link mechanism that turns the column shaft according to rock of the rocking bar; and
    a base member that is fixed to the vehicle-body frame and rockably holds the rocking bar,
    wherein the rocking bar and the link mechanism are housed in the vehicle-body frame,
    the rocking bar is rockably attached to the vehicle-body frame via the base member,
    a position at which the rocking bar is connected to the link mechanism is displaced from a position at which the rocking bar is connected to the base member, and
    the position at which the rocking bar is connected to the link mechanism is on a rear side of the position at which the rocking bar is connected to the base member.

* * * * *